United States Patent
Roberts et al.

[11] Patent Number: 5,845,389
[45] Date of Patent: Dec. 8, 1998

[54] METHOD OF FABRICATING A WOUND CORE

[75] Inventors: Dale Allen Roberts, Pasadena; James Howard DeOms, Glen Arm; Manvel Allan Geyer, Severna Park, all of Md.

[73] Assignee: Northrop Grumman Corporation, Los Angeles, Calif.

[21] Appl. No.: 784,387

[22] Filed: Jan. 17, 1997

Related U.S. Application Data

[62] Division of Ser. No. 253,434, Jun. 4, 1994, abandoned.

[51] Int. Cl.$^6$ .................................................. H02K 15/10
[52] U.S. Cl. ................................ 29/596; 29/598; 310/42; 310/45; 310/215
[58] Field of Search ..................... 29/596, 598; 310/45, 310/211, 212, 214, 215, 42; 164/DIG. 10

[56] References Cited

U.S. PATENT DOCUMENTS

| | | |
|---|---|---|
| 3,092,744 | 6/1963 | Stonebrook . |
| 4,115,915 | 9/1978 | Godfrey . |
| 4,204,314 | 5/1980 | Workman . |
| 4,362,959 | 12/1982 | Bartheld et al. . |
| 4,758,758 | 7/1988 | Laing . |
| 5,185,918 | 2/1993 | Shafer, Jr. . |

FOREIGN PATENT DOCUMENTS 1594926  8/1981  United Kingdom .

OTHER PUBLICATIONS

"Method of Manufacturing Induction Machine Rotors," Research Disclosure, Sep. 1991.

*Primary Examiner*—Carl E. Hall
*Attorney, Agent, or Firm*—Walter G. Sutcliff

[57] ABSTRACT

A wound core assembly and a method of manufacturing wherein the coil windings are cast and interconnected within the insulated chambers and end conductor molds. The insulated chambers act as the mold and subsequent insulation for the straight wire sections of each coil winding. After alignment of end conductor molds to connect predetermined chambers, coil windings are cast, the end conductors being formed within the passages of the end conductor molds.

7 Claims, 5 Drawing Sheets

METHOD OF FABRICATING A WOUND CORE

This application is a divisional of application Ser. No. 08/253,434 filed on Jun. 6, 1994, now abandoned, the entire contents of which are hereby incorporated by reference.

FIELD OF THE INVENTION

The present invention relates to a wound core; and more particularly to wound cores for electric motors, generators and inductors and to a method of fabricating same. Although the present invention is suitable for wound cores of various electric machines, it is especially suited for a distributed wound AC induction motor stator core, and will be particularly described in that connection.

DESCRIPTION OF THE RELATED ART

A conventional wound core assembly for electric motors or generators is typically formed by fabricating laminations and stacking them to a desired stator length. The stack is welded together on the outside diameter to hold it in that configuration. Each stator lamination, and, therefore, the resultant stator core, contains a plurality of punched slots to hold the wound coils.

The winding operation typically involves forming coils by bending varnish insulated wires to the desired winding shape. The pre-shaped coils are then inserted into the stator slots. Because coil winding in a distributed wound motor involves positioning one straight portion of each coil in a different relative radial position in the stator slots, coil insertion is very complex. Although fabrication of individual coils has been automated, insertion of the coils to form the entire wound core assembly is accomplished manually.

After insertion of coils, coil ends are interconnected, typically, either by brazing or by crimping, for example. The entire stator core is then insulated.

This method of fabricating a wound core assembly has various limitations. First, flux peaking can occur at the outer ends of the slots because the slots must be opened for insertion of the coils. This high magnetic field in a very local area results in less efficient operation.

In addition, as insulated metal wire is limited in the angle it can be bent before breaking or cracking, the end turn radius of the pre-shaped coils is limited. This causes larger coils and larger and heavier wound assemblies than necessary. Furthermore, the resistance of a wire is related to its length. A longer wire is of higher resistance. As power dissipation is directly proportional to resistance, a longer wire will result in higher power loss.

Lastly, manual winding of the coils causes high labor costs and practical limitations in the number of core slots.

In light of the foregoing, there is a need for a wound core assembly and related method of manufacture that is automated and permits sharper end turns on the coils.

SUMMARY OF THE INVENTION

Accordingly, the present invention is directed to a wound core assembly and related method that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described herein, the invention provides a method of fabricating a wound core assembly where the core has a plurality of peripherally spaced, axial slots extending to opposite ends of the core, the method including dividing each slot into a plurality of radially spaced insulated chambers; positioning end conductor molds having passages in alignment with the insulated chambers at the opposite ends of the core; filling the insulated chambers and the passages of the end conductor molds with molten conductive material; permitting the molten conductive material to solidify; removing the end molds to expose the opposite end conductor portions of the winding assembly; and covering the end conductor portions with insulation.

In another aspect, there is provided a wound core assembly, including a core having opposite ends and a plurality of peripherally spaced radial slots extending axially to the opposite ends, the slots being divided into a plurality of insulated chambers; conductive material filling each chamber; and a plurality of end conductors extending from and electrically connecting the conductive material of a portion of the chambers to conductive material in other chambers at each opposite end of the core.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of this specification, illustrate preferred embodiments of the invention, and, together with a description, serve to explain the principles of the invention.

DESCRIPTION OF THE PREFERRED EMBODIMENTS

Figure 1:
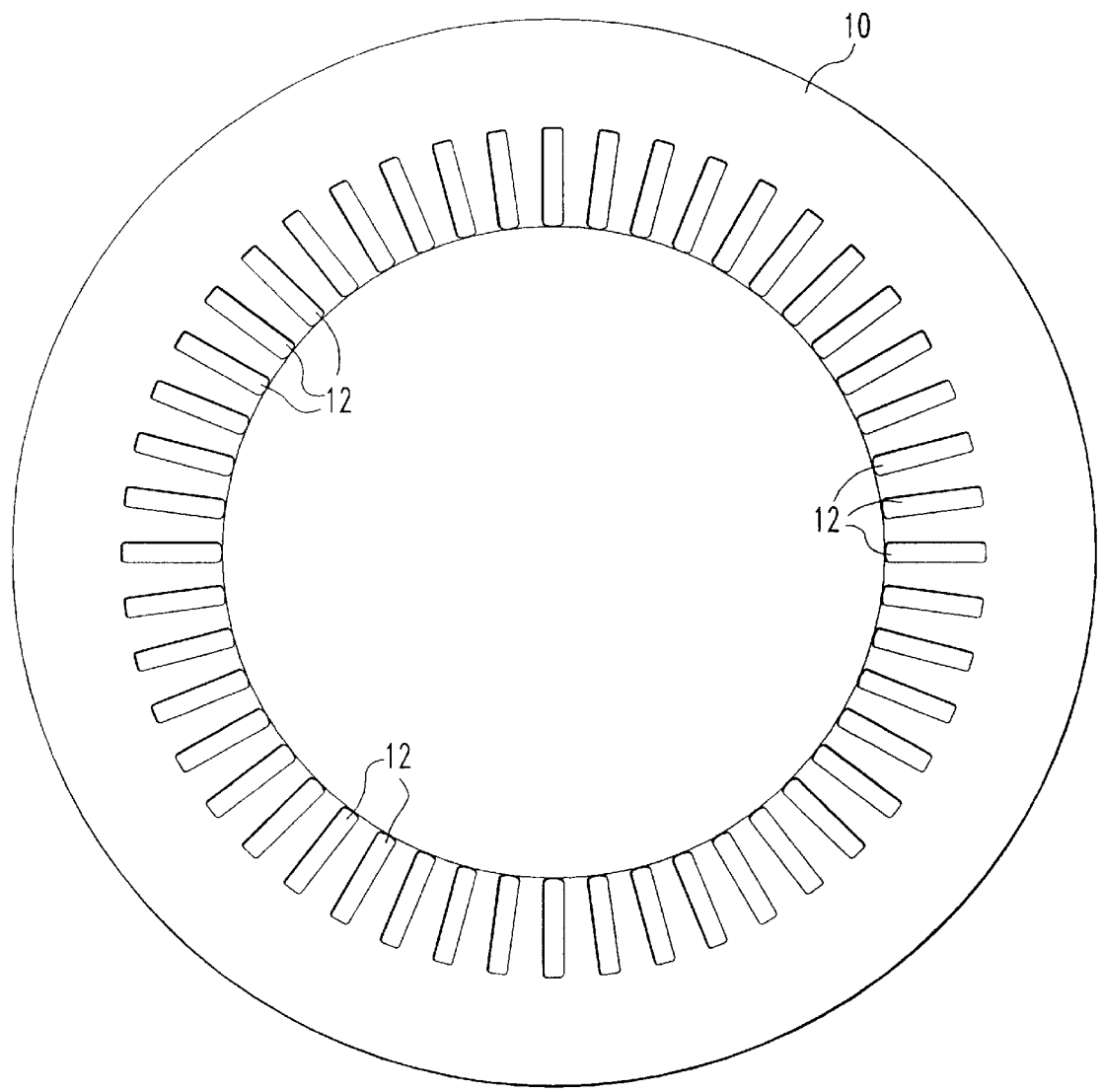
FIG. 1 is an end view of a stator core without a winding in accordance with one embodiment of the present invention.

Reference will be made in detail to the present preferred embodiments of the invention, examples of which are illustrated in the accompanying drawings. Like reference numerals refer to like parts in the various Figures of the drawings.

In accordance with the invention, a wound core assembly is provided comprising a core having opposite ends and a plurality of peripherally spaced radial slots extending axially to the opposite ends, the slots being divided into a plurality of insulated chambers.

As embodied herein and referring to FIG. 1, an electric motor stator core 10 includes a plurality of peripherally spaced stator slots 12 extending axially between the ends of core 10.

Figure 2:
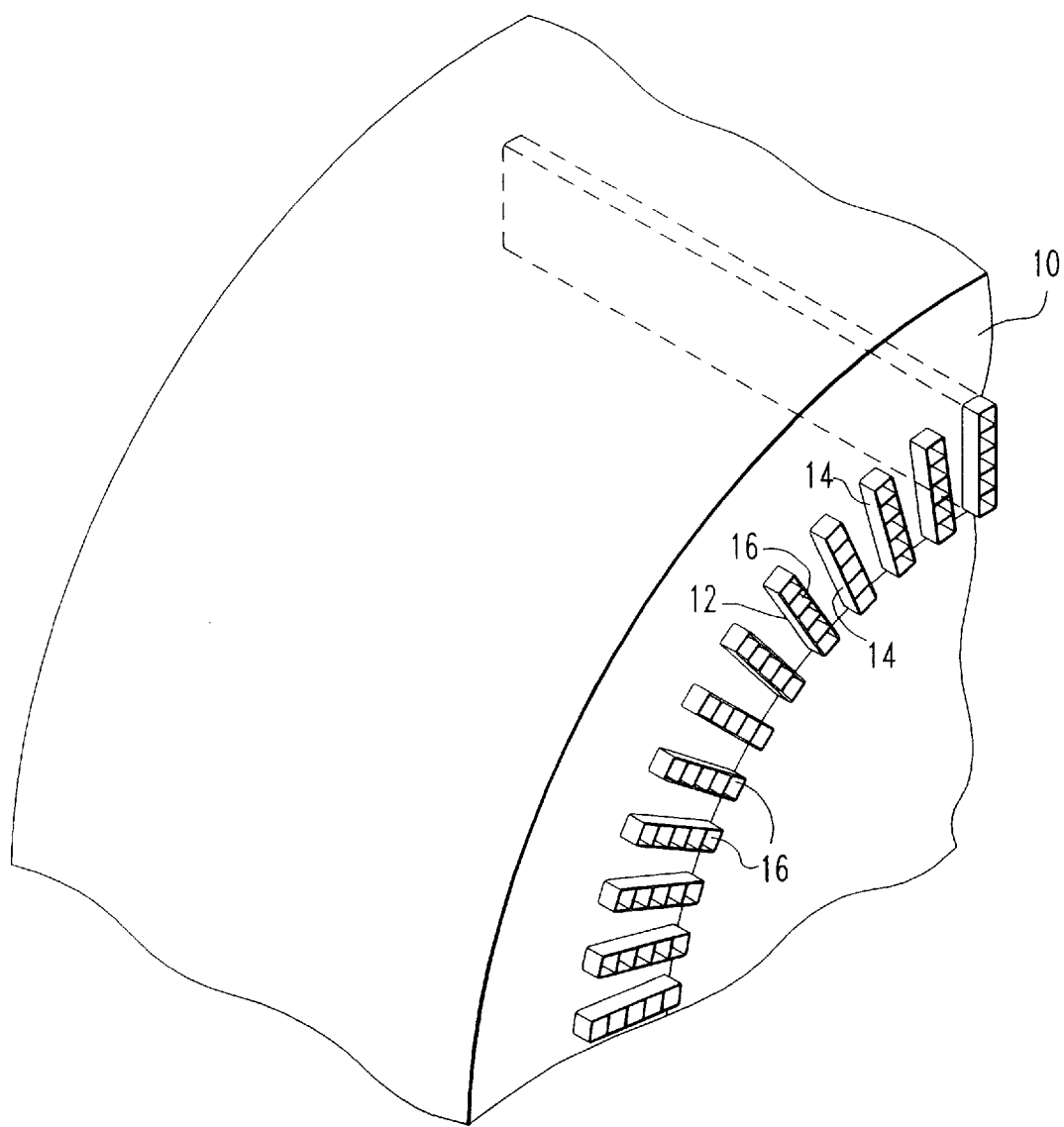
FIG. 2 is an enlarged fragmentary perspective view of a stator core and insulation members according to one embodiment of the present invention.
Figure 3:
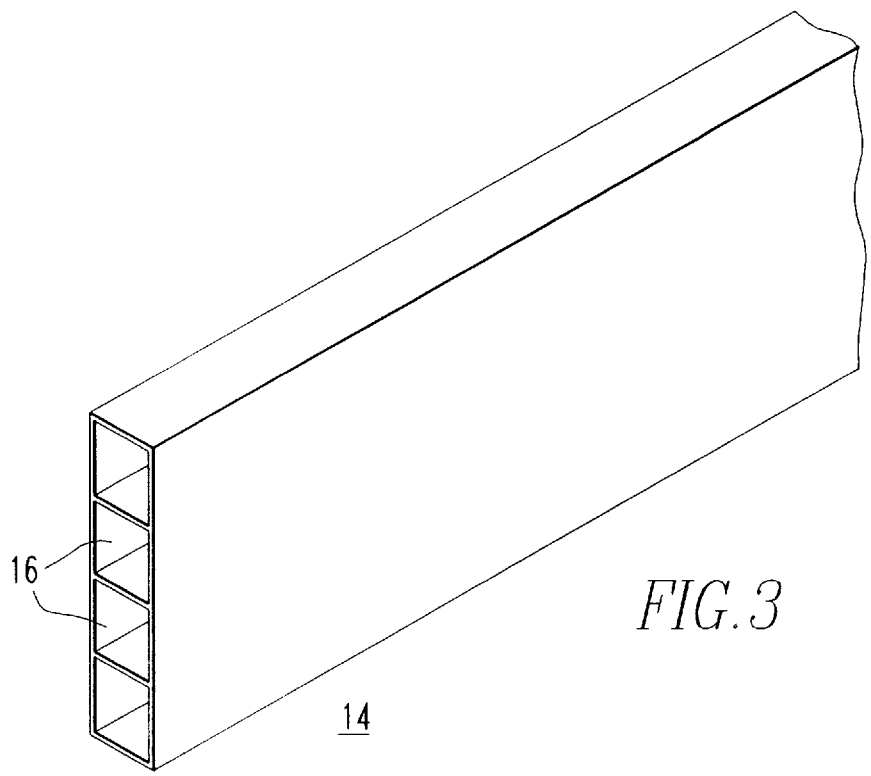
FIG. 3 is a perspective view of an insulation member that is used in the embodiment of FIG. 2.

Referring to FIG. 2 and as embodied herein, each slot 12 contains an insulation member 14 extending to and protruding slightly from the opposite ends of core 10. Referring additionally to FIG. 3, each member 14 is divided into a plurality of chambers 16. The straight portions of the stator coil windings will be cast directly into chambers 16. As members 14 will provide insulation for conductive material contained within chambers 16, members 14 are preferably comprised of a ceramic material. The external configuration of each insulation member 14 is that of slots 12, so that members 14 fit snugly within each slot 12.

Preferably, the slots 12 and the external configuration of each insulation member 14 are rectangular. Furthermore, chambers 16 are preferably rectangular in cross section, conforming to the present state of motor technology. However, the shape of chambers 16 and, thus, the shape of the straight portions of the resultant stator coil windings, may vary in any manner to effect motor efficiency. For example, chambers 16 may taper so that there is more copper at the outer diameter of slots 12, causing higher flux at the outer diameter.

The number of chambers 16 per insulation members 14 depends upon the number of turns and straight sections per individual coil winding. Additionally, torque is a function of the number of turns in a coil. Thus, as the number of chambers and the number of sections in a coil winding increases, torque increases without a change in current.

In accordance with the invention, the wound core assembly further includes conductive material filling each chamber and a plurality of end conductors extending from and electrically connecting the conductive material of a portion of the chambers to conductive material in other chambers at each opposite end of the core.

Figure 4:
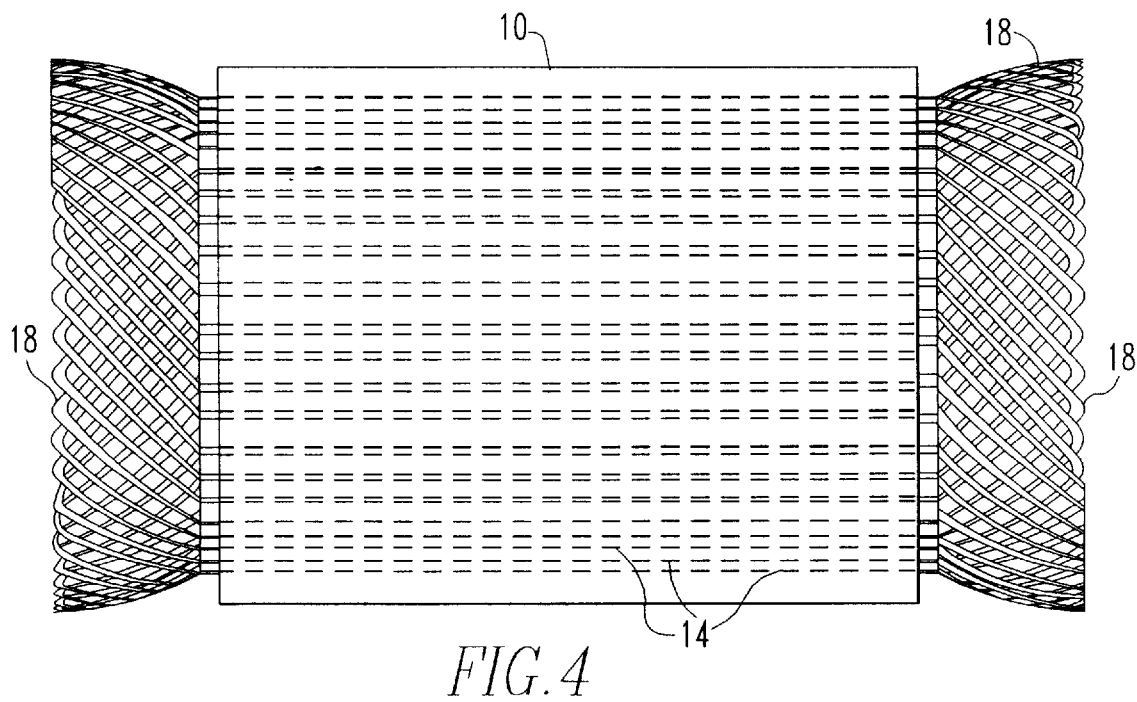
FIG. 4 is a side view of a wound stator core assembly incorporating the teachings of the present invention.

As embodied herein and referring to FIG. 4, the winding assembly includes end conductors 18. Preferably, end conductors 18 and the conductive material within the chambers 16 are comprised of copper, due to its high conductivity.

End conductors 18 connect predetermined chambers 16 of insulation members 14. For example, for a four-phase AC induction motor with 48 stator slots, a chamber 16 of every twelfth slot is connected at different relative radial positions.

Figure 5:
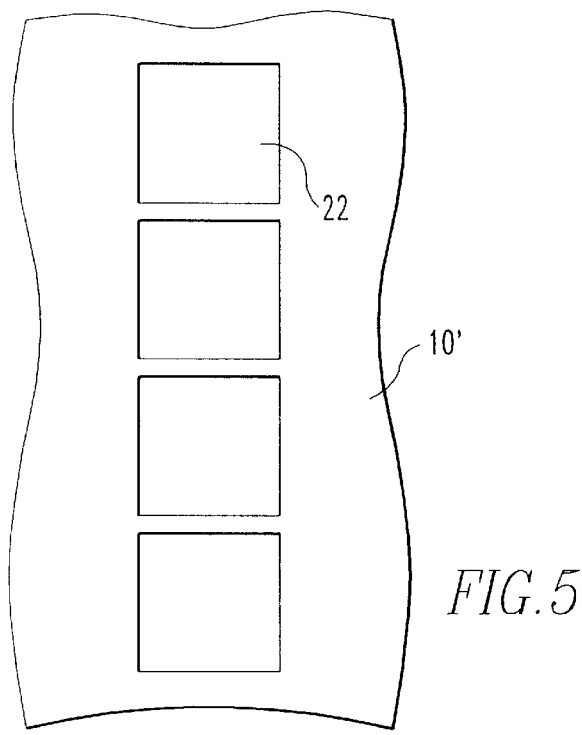
FIG. 5 is a fragmentary end view of a stator core without a winding according to a second embodiment of the present invention.
Figure 6:
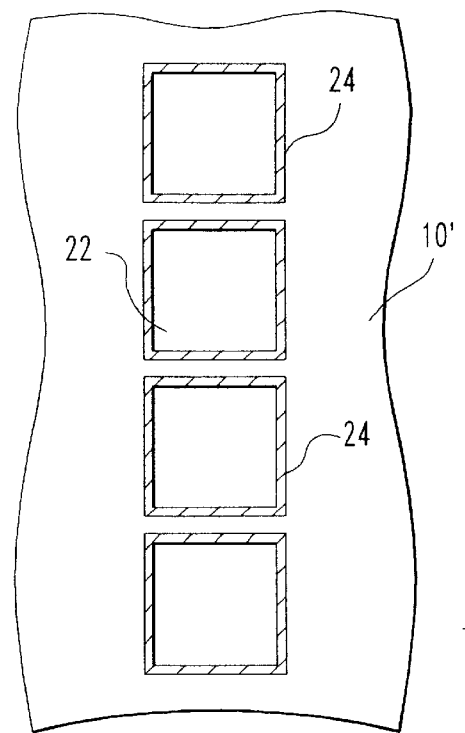
FIG. 6 is a fragmentary end view of a stator core having insulated chambers according to the second embodiment of the present invention.

In a second embodiment of the invention as shown in FIG. 5, a core 10' has a plurality of radially spaced chambers 22. Each chamber 22 extends axially to the opposite ends of stator core 10'. As shown in to FIG. 6, each chamber 22 is lined with insulation material 24. The insulated chambers 22 are to be filled with the straight wire portions of the stator coil windings. Otherwise, the second embodiment is similar to the first embodiment.

In manufacturing a wound core assembly of the present invention, a core is formed having a plurality of peripherally spaced axial slots extending to the opposite ends of the core, each slot divided into a plurality of radially spaced insulation chambers.

In one embodiment, a plurality of radially extending slots are formed in each stator core lamination by punching or a similar process. The core 10 is formed by stacking and bonding multiple layers to a desired core length with the peripherally spaced axial slots 12 extending to the opposite ends of core 10.

Ceramic insulation members 14 containing chambers 16, as shown in FIG. 3, are then inserted into stator slots 12. Chambers 16 constitute the mold and subsequent insulation for straight wire sections of individual coil windings. Members 14 are made to protrude slightly from both ends of stator slots 14. Although not necessary, these protrusions ease the alignment of insulation members 14 with the end mold.

The method of the present invention further includes positioning, at the opposite ends of the core, end conductor molds having passages in alignment with the insulation chambers.

Figure 7:
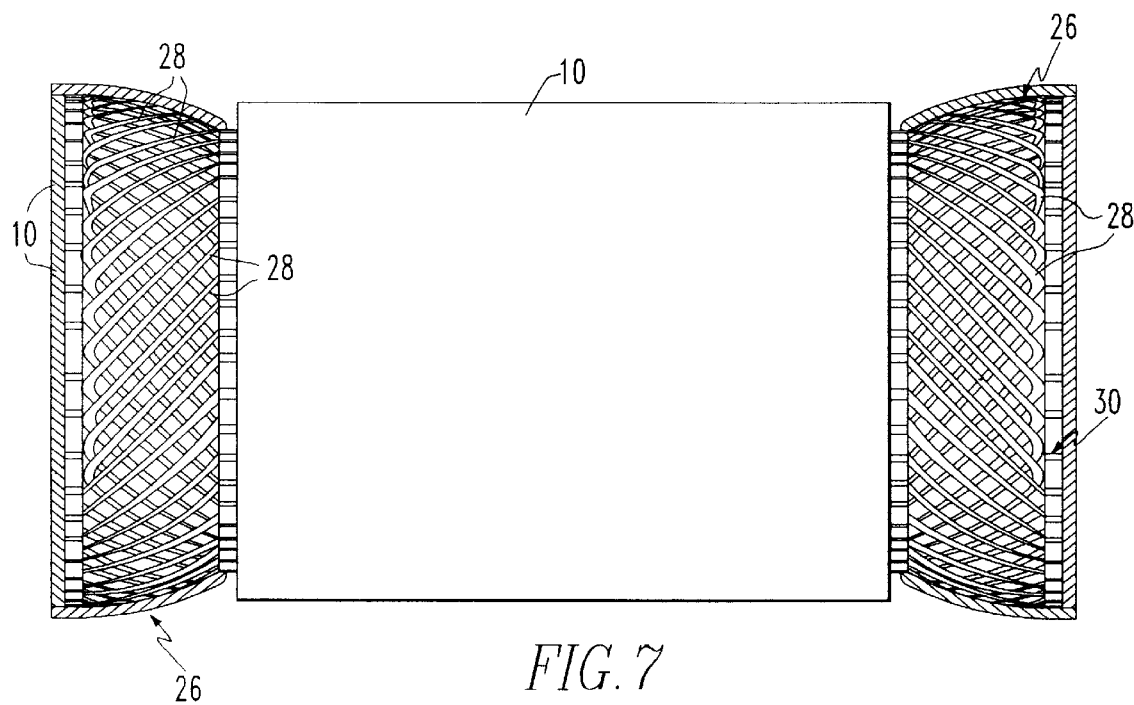
FIG. 7 is a side view of a stator core and end molds with the exterior of the end molds removed to show the arrangement of passages in accordance with the present invention.

Referring to FIG. 7 and as embodied herein, two end conductor molds 26 are formed to cast end conductors 18. Molds 26 contain passages 28 connecting predetermined chambers 16. Each passage 28 constitutes the mold for an end turn of an individual coil winding. Depending upon the motor design, any necessary interconnections between resultant coil windings are cast within end conductor molds 26. Gates 30 at the beginning of each mold 26 provide access to chambers 16 and passages 28 of end conductor molds 26. The passages 28 and, therefore, the end conductors 18, may be formed at sharp angles to minimize the length of the connection between chambers 16. A shorter, lighter coil winding results with less power dissipation along the end conductors 18.

The investment casting process, sometimes called lost wax process, preferably forms the molds 26. This procedure permits accurate metal casting. The procedure consists of preparing a wax pattern of the end conductors. The pattern is then sprayed or dipped in a refractory aggregate. Once the aggregate sets, the mixture is heated so that the wax burns out.

In accordance with the present invention, the method further includes filling the insulated chambers and passages of the end conductor molds with molten conductive material and permitting the molten conductive material to solidify to form the wound assembly.

As embodied herein, after molds 26 are aligned with preselected chambers 16, molten copper is poured into each gate 30 and flows through passages 28 and chambers 16. The molten copper is then permitted to harden.

The method of the present invention further comprises removing the end molds to expose the opposite end conductor portions of the winding assembly. After molds 26 are removed, any bosses formed from gates 30 can be cut off.

In accordance with the invention, the method further comprises covering the end conductor portions with insulation. The wound core assembly, as embodied herein, is covered with insulation by dipping it in a varnish or epoxy material and baking. This process covers exposed end conductors 18 with insulation, fills any air gaps between insulation members 14 and stator slots 12, and keeps moisture out of the motor.

In the second embodiment, a plurality of radially spaced holes are formed in stator core lamina by punching or a similar process. A stator core 10' results by stacking and bonding multiple layers to a desired length, core 10' containing a plurality of peripherally and radially spaced axial chambers 22 extending to the opposite ends of core 10'. The chambers 22 are then covered with insulation material 24 by either dipping or spraying with ceramic coating or by inserting individual ceramic insulation members into each chamber 22. The chambers 22 act as the mold and subsequent insulation from the straight wire portions of the coil windings. Otherwise, the manufacturing process according to the second embodiment is similar to that of the first embodiment.

Figure 8:
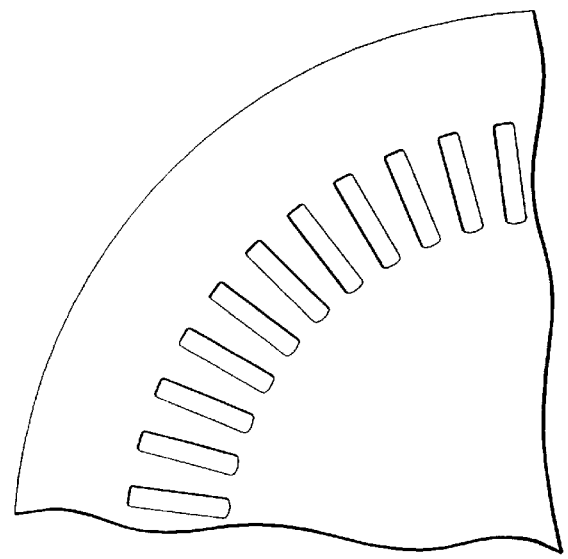
FIG. 8 is a fragmentary end view of a rotor core without a winding assembly in accordance with the present invention.

The manufacturing process and apparatus of the-present invention has broad application to electric machinery. It not only applies to stator assembly of electric motors and generators, but also to rotor assembly, as shown in FIG. 8, and to any other type of inductive coil assembly. The winding assembly may be either distributed or concentric.

It will be apparent to those skilled in the art that various modifications and variations can be made in the wound core assembly and related method of the present invention without departing from the spirit or scope of the invention. Thus, it is intended that the present invention cover the modifications and variations of this invention provided they come within the scope of the appended claims and their equivalents.

What is claimed is:

1. Method of fabricating a wound core assembly, wherein the core has a plurality of peripherally spaced axial slots extending to opposite ends of the core, the method comprising:

dividing each slot into a plurality of radially spaced insulation chambers;

positioning end conductor molds having passages in alignment with the insulation chambers at the opposite ends of the core;

filling said insulation chambers and said passages of the end conductor molds with molten conductive material;

permitting the molten conductive material to solidify;

removing the end molds to expose the opposite end conductor portions of the winding assembly; and covering said end conductor portions with insulation.

2. The process according to claim 1, wherein the step of dividing said slots comprises inserting ceramic insulation members into said slots, said insulation members having external configuration of said slots, each said insulation member containing a plurality of chambers.

3. The process according to claim 1, wherein the step of dividing said slots comprises the substeps of:

forming a plurality of radially spaced chambers; and covering the chambers with insulation.

4. The process according to claim 3, wherein the step of forming said chambers comprises punching a plurality of radially spaced chambers.

5. The process according to claim 3, wherein the step of covering the chambers with insulation comprises inserting rectangular ceramic insulation members into said chambers, said insulation members having external configuration of said chambers.

6. The process according to claim 1, wherein the step of covering said end conductor portions comprises the substeps of:

dipping said core into insulating material; and baking said core.

7. Method of fabricating a wound core assembly comprising:

forming a plurality of peripherally spaced, radially extending rectangular slots into core lamina;

stacking and bonding said lamina to a preselected length to form a core having a plurality of peripherally spaced axial slots extending to the opposite ends of the core;

forming ceramic insulation members having external configuration of the core slots, each member containing a plurality of rectangular chambers for conductive material;

inserting said insulation members longitudinally into said slots;

casting end conductor molds having passages for conductive material;

positioning end conductor molds having passages in alignment with said chambers at the opposite ends of the core;

filling said passages and said chambers with molten copper;

permitting the molten copper to solidify;

removing the end molds to expose the opposite end conductor portions of the core assembly;

dipping said core into one of the group consisting of varnish and epoxy insulating material; and baking said core.

* * * * *